July 3, 1951   O. E. SZEKELY   2,559,379
THREE WHEEL STEERING ASSEMBLY
Filed Feb. 5, 1949   3 Sheets-Sheet 1
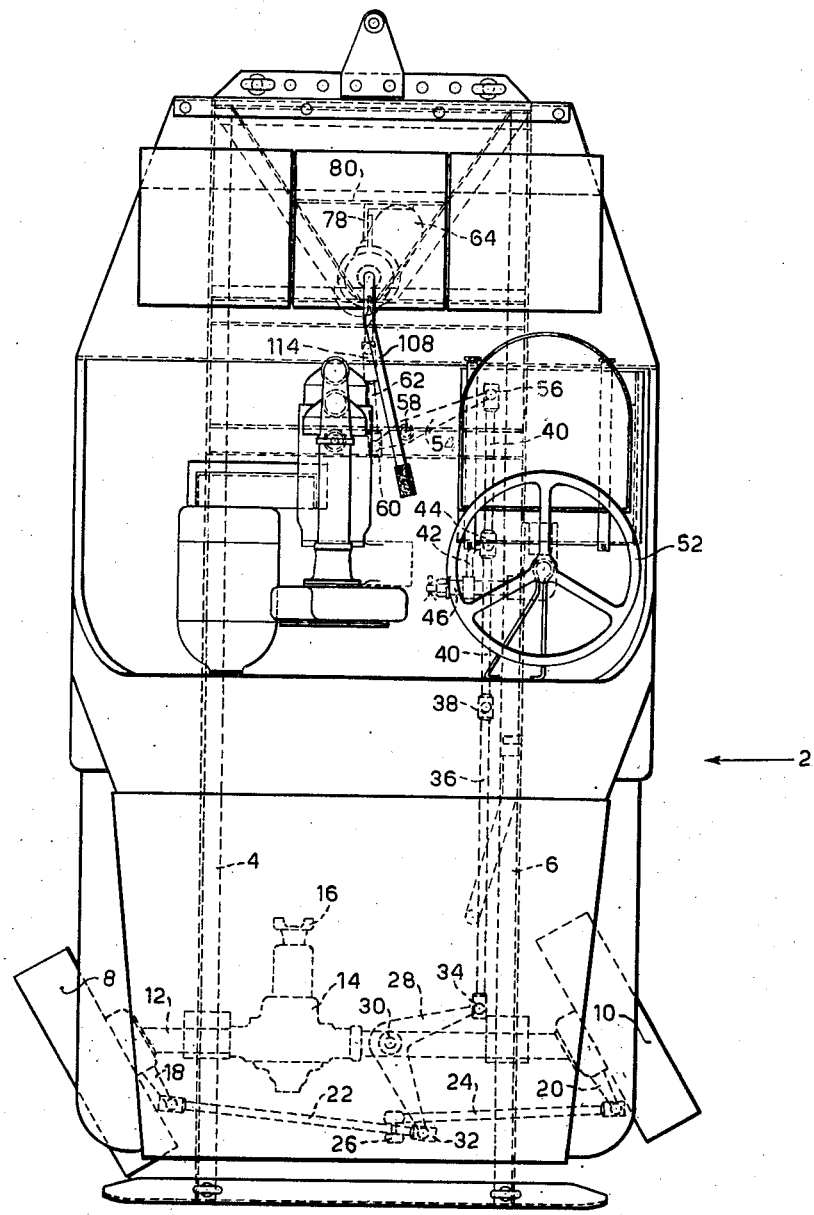
FIG. I.
INVENTOR.
OTTO E. SZEKELY
BY Busser & Harding
ATTORNEYS.

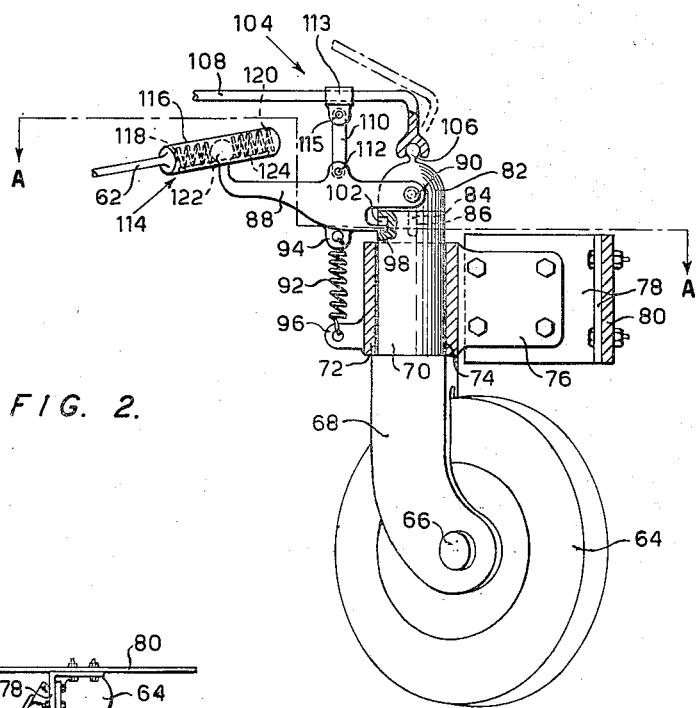
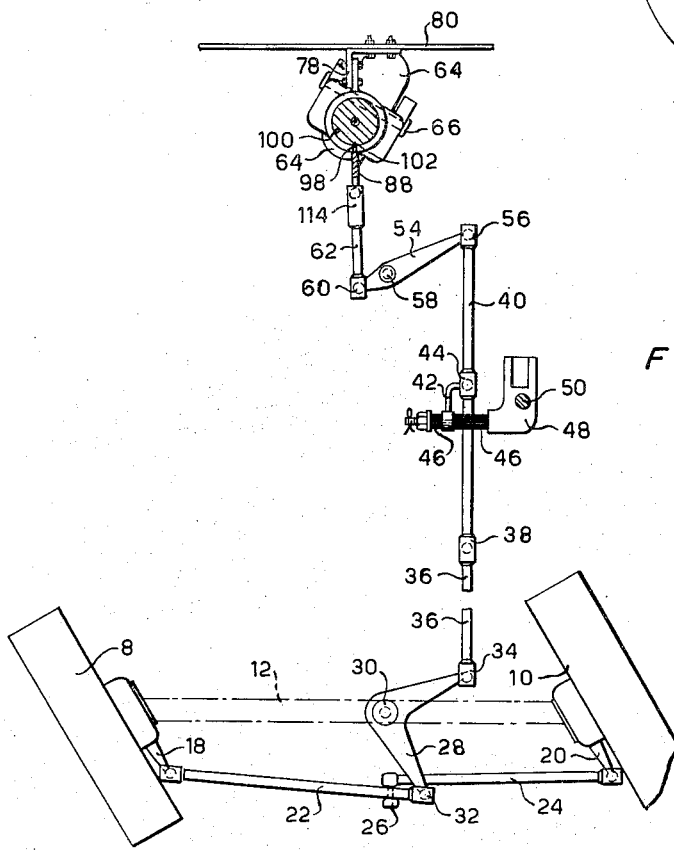

July 3, 1951     O. E. SZEKELY     2,559,379
THREE WHEEL STEERING ASSEMBLY

Filed Feb. 5, 1949     3 Sheets-Sheet 3

INVENTOR.
OTTO E. SZEKELY
BY
*Bussert Harding*
ATTORNEYS

Patented July 3, 1951

2,559,379

UNITED STATES PATENT OFFICE 2,559,379

THREE-WHEEL STEERING ASSEMBLY

Otto E. Szekely, Philadelphia, Pa., assignor, by mesne assignments, to O. E. Szekely & Associates, Inc., Philadelphia, Pa., a corporation of Pennsylvania Application February 5, 1949, Serial No. 74,825

4 Claims. (Cl. 280—91)

This invention relates to a motor driven vehicle and more particularly relates to a vehicle which is particularly suitable for servicing airplanes, for example, on a carrier flight deck.

A broad object of this invention is to provide a motor driven vehicle which may be used for servicing planes and which is especially useful for servicing planes on a carrier flight deck.

A further object of this invention is to provide a motor driven vehicle which has a very small turning circle.

An additional object of this invention is to provide a motor driven vehicle suitable for servicing planes and which is adapted to move bodily in a sidewise direction.

A still further object of this invention is to provide a motor driven vehicle having both steerable front wheels and a centrally located and steerable rear wheel.

A still further object of this invention is to provide a motor driven vehicle suitable for servicing airplanes having steerable front wheels and a centrally located rear wheel which may be steered in opposition to the front wheels.

A still further object of this invention is to provide a motor driven vehicle having steerable front wheels and a centrally located rear wheel which is steerable in parallelism with the front wheels.

These and other objects of this invention will become apparent on reading the following description in conjunction with the accompanying drawings, in which:

Figure 1 is a plan view of a vehicle in accordance with this invention;

Figure 2 is a side view of the rear wheel of Figure 1 and a portion of its associated steering mechanism;

Figure 3 is a plan view of the steering mechanism shown in Figure 1 showing a section of the rear wheel mechanism taken on the line A—A and showing the front and rear wheels as steered in opposition to each other.

Figure 4:
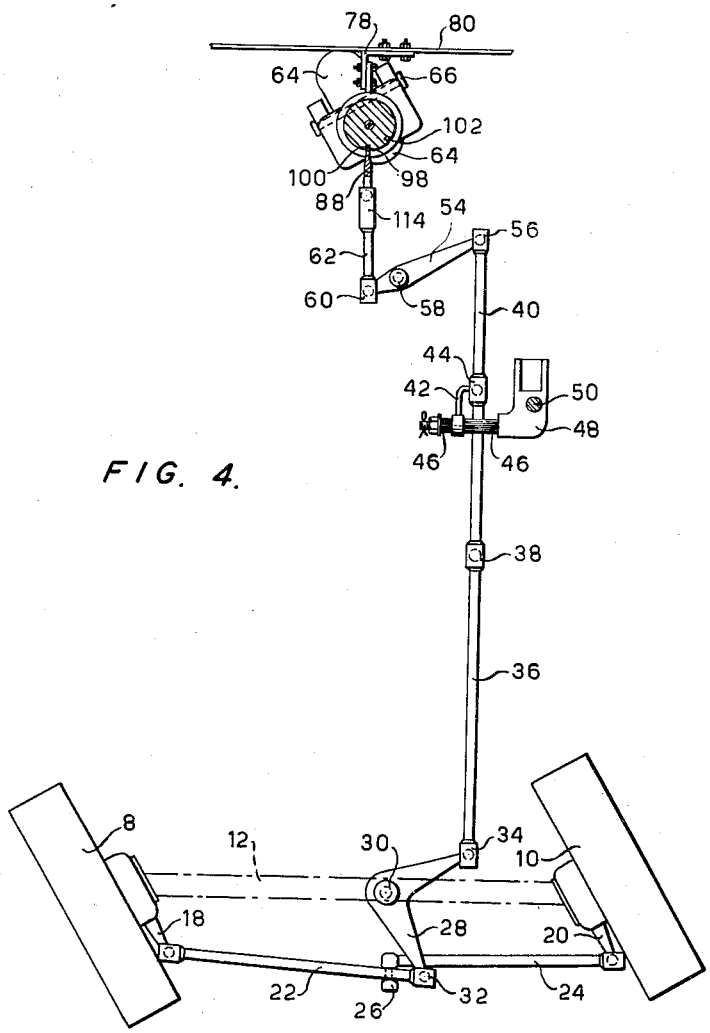
Figure 4 is a plan view of the steering mechanism of Figure 1 and showing the front and rear wheels as steered in parallelism.

Generally speaking, this invention comprises a vehicle which has steerable front wheels and a centrally located rear wheel which can be selectively steered either in the direction opposite to that of the front wheels in order to facilitate the vehicle's turning in a minimum space or in parallelism with the front wheels thus causing the vehicle to be moved bodily in the directions in which the wheels point. It will be apparent that this invention may be embodied in numerous forms.

More specifically, and as illustrative of one of the specific embodiments of this invention, a motor driven vehicle 2 (Figure 1) is a modified version of an army 4 x 4¼ ton truck (jeep). The vehicle 2 has longitudinal frame members 4 and 6 which are transversely braced. Front wheels 8 and 10 are driven through axle 12, differential 14 and drive shaft 16 which is connected to a motor (not shown) through a conventional transmission (not shown). Wheels 8 and 10 are connected to axle 12 in conventional manner so that they may be steered.

In order to reduce side slip of the vehicle 2, incident, for example, to the rolling and pitching of a carrier flight deck, the front wheels 8 and 10 have tires which have straight outside walls, that is, walls which lie in a vertical plane, and flat treads substantially the full width of the tire.

Arms 18 and 20 are secured to wheels 8 and 10 and tie-rods 22 and 24, respectively. Tie-rods 22 and 24 are pivotally secured together at 26. A bell crank 28 which is pivotally secured to the vehicle 2 at 30 is secured to tie-rod 22 by socket joint 32. Bell crank 30 is secured by a socket joint 34 to rod 36. The steering assembly thus described is conventional and well known to the art.

Rod 36 is secured by a ball joint 38 to rod 40. A steering arm 42 is connected to rod 40 by a ball joint 44 and is splined to shaft 46. Shaft 46 is, in turn, connected to a conventional worm type steering gear mechanism in housing 48. A conventional steering column 50 has a steering wheel 52.

Shaft 40 is connected to lever 54 by a ball joint 56. Lever 54 is pivoted at 58 and, in turn, through a ball joint 60 connected to rod 62.

A rear wheel 64 is carried by an axle 66 secured to fork 68. Fork 68 has a shaft portion 70 which is rotatably mounted in a bushing 72. Axle 66 is offset to the rear of shaft portion 70. A rubber liner 74 may be placed between the shaft portion 70 and the bushing 72. Bushing 72 is carried by a plate 76 which is bolted to a bracket 78 which is, in turn, bolted to vehicle frame 80.

The shaft portion 70 carries a cap 82. Cap 82 has a pin 84 which is retained by an opening 86 in the shaft portion 70. This mounting permits cap 82 to rotate with respect to shaft portion 70.

A lever 88 is pivotally secured to cap 82 at 90. Lever 88 is biased downwardly by a coil spring 92 which is secured to a bracket 94 attached to lever 88 and a bracket 96 attached to bushing 72. Lever 88 has a projecting pin 98. Pin 98 is adapted to fit snugly between the sides of opening 100 or opening 102 located in shaft portion 70 (see Figures 2, 3 and 4).

A lever 104 is secured to cap 82 by ball joint 106 and has an arm 108 which is located within reach of the driver of the vehicle and a link 110 which is pivotally secured to the top of lever 88 at 112 and the clip 113 on arm 108 at 115.

Rod 62 is connected to lever 88 by spring ball joint 114. The spring ball joint 114 has a cylinder 116 containing a pair of coil springs 118 and 120. Located between the springs is a ball 122 which is secured to lever 88. A slot 124 in the bottom of cylinder 116 permits lever 88 and ball 122 to move in a lengthwise direction with respect to cylinder 116.

From the above description it will be apparent that the rear wheel 64 can be selectively steered so as to be parallel at all times with the front wheels or be steered in a direction opposite to that in which the front wheels are being steered. The direction in which the rear wheel is steered may be readily determined by the driver of the vehicle. Assuming that the driver desires to make a left hand turn and that all the wheels are on the center line, the driver holding arm 108 in the raised position can, by turning arm 108 about ball joint 106, freely move lever 88. In the case being considered, he will move arm 108 towards the left side of the vehicle and position it so that pin 98 is opposite opening 102, at which time he will lower lever 108 thus placing pin 98 in opening 102. It will be noted that, as lever 108 is moving towards this described position, spring 120 in the cylinder 116 will be compressed, thus, in effect, providing sufficient play in rod 62 to permit lever 88 to take the desired position.

As will be made more apparent from an observation of Figure 3, when steering wheel 52 and steering column 50 are rotated to the left, splined shaft 46 turns causing steering arm 42 to carry rod 40 rearwardly. This causes rod 36 to be carried rearwardly and crank 28 to rotate counter-clockwise and carry the tie-rods 22 and 24 to the left. This, of course, turns the front wheels 8 and 10 to the left.

At the same time, rod 40 causes lever 54, as observed in Figure 2, to rotate counterclockwise carrying rod 62 in a forward direction. When rod 62 moves forwardly, it will be apparent that lever 88 and cap 82 will be carried around in a clockwise direction as seen in Figure 3, thus causing wheel 64 to turn in the direction opposite from that in which the front wheels turn.

Similarly, it will be equally apparent that movement of steering arm 42 in a forward direction will cause the front wheels to turn to the right and the rear wheel to turn to the left. It will be noted that, whereas the steering arm 42 is splined to shaft 46, it is adapted to be carried sidewise on rod 40 when it is displaced sidewise incident to the movement of lever 54 and crank 28.

Again should it be desirable to move the vehicle body in a direction parallel to the direction in which the front wheels are pointed, this may be accomplished. Assuming now that all of the wheels are again located in the center line position, the operator of the vehicle may raise arm 108 disengaging pin 98 from opening 102. He then may rotate crank 104 toward the right side of the vehicle and lower pin 98 into engagement with opening 100.

Observation of Figure 4 will make it apparent that, when pin 98 is thus located in opening 100, the rear wheel will be steered so as to be maintained in parallel relation to the front wheels. Thus as steering arm 42 moves rod 40 rearwardly to turn the front wheels to the left, lever 54 is rotated counterclockwise and rod 12 is moved forwardly causing lever 88 and cap 82 to be carried in a counterclockwise direction. Since pin 98 is engaged in opening 100, it will be apparent that shaft portion 70 will be rotated in a counterclockwise direction as observed in Figure 4. This results in turning the same direction as the front wheels, that is, to the left. The linkages from the steering arm 42 to the front wheels and to the rear wheel are so constructed and arranged that the rear wheel will turn degree for degree with the front wheels.

What I claim and desire to protect by Letters Patent is:

1. A power driven vehicle having a pair of front wheels, a steering mechanism, a linkage system connecting the steering mechanism and the front wheels, a centrally located rear wheel, a rotatable shaft carrying said rear wheel, an opening located in said shaft on each side of the center line of the rear wheel, a lever having one end mounted on said shaft for both horizontal and vertical pivoting, a finger on said lever adapted to engage selectively an opening in said shaft, means to pivot said lever in a horizontal and vertical direction to shift said finger from one opening to the other opening, linkage means connecting the unpivoted end of the lever to said steering mechanism, whereby said rear wheel can be turned in the same direction as the front wheels when said finger is in one opening and in the opposite direction to the front wheels when said finger is in the other opening.

2. A power driven vehicle having a pair of front wheels, a steering mechanism, a linkage system connecting the steering mechanism and the front wheels, a centrally located rear caster wheel, a rotatable shaft carrying said rear wheel, an opening located in said shaft on each side of the center line of the rear wheel, a lever having one end mounted on said shaft for both horizontal and vertical pivoting, a finger on said lever adapted to engage selectively an opening in said shaft, means to pivot said lever in a horizontal and vertical direction to shift said finger from one opening to the other opening, linkage means connecting the unpivoted end of the lever to said steering mechanism, whereby said rear wheel can be turned in the same direction as the front wheels when said finger is in one opening and in the opposite direction to the front wheels when said finger is in the other opening.

3. A power driven vehicle having a pair of front wheels, a steering mechanism, a linkage system connecting the steering mechanism and the front wheels, a centrally located rear wheel, a rotatable shaft carrying said rear wheel, an opening located in said shaft on each side of the center line of the rear wheel, a lever having one end mounted on said shaft for both horizontal and vertical pivoting, a finger on said lever adapted to engage selectively an opening in said shaft, means to pivot said lever in a horizontal and vertical direction to shift said finger from one opening to the other opening, an upstanding ball on the unpivoted end of said lever, a substantially horizontal cylinder adapted to receive said ball and having a slot through which the lever passes, said cylinder having springs arranged on either side of the ball in order to bias the ball to a central position within the cylinder and one end of said cylinder being connected to a linkage system which is connected to the steering mechanism.

4. A power driven vehicle having a pair of front wheels, a steering mechanism, a linkage system connecting the steering mechanism and the front wheels, a centrally located rear caster wheel, a rotatable shaft carrying said rear wheel, an opening located in said shaft on each side of the center line of the rear wheel, a lever having one end mounted on said shaft for both horizontal and vertical pivoting, a finger on said lever adapted to engage selectively an opening in said shaft, means to pivot said lever in a horizontal and vertical direction to shift said finger from one opening to the other opening, an upstanding ball on the unpivoted end of said lever, a substantially horizontal cylinder adapted to receive said ball and having a slot through which the lever passes, said cylinder having springs arranged on either side of the ball in order to bias the ball to a central position within the cylinder and one end of said cylinder being connected to a linkage system which is connected to the steering mechanism.

OTTO E. SZEKELY.

REFERENCES CITED

The following references are of record in the file of this patent:

UNITED STATES PATENTS

| Number | Name | Date |
| --- | --- | --- |
| 1,255,775 | Mueller | Feb. 5, 1918 |
| 1,289,678 | Cox | Dec. 31, 1918 |
| 1,666,185 | Strite | Apr. 17, 1928 |
| 1,866,393 | Brooks | July 5, 1932 |

FOREIGN PATENTS

| Number | Country | Date |
| --- | --- | --- |
| 329,692 | Great Britain | June 5, 1930 |